United States Patent [19]
Genise

[11] Patent Number: 5,425,689
[45] Date of Patent: Jun. 20, 1995

[54] ENGINE BRAKE ENHANCED UPSHIFT CONTROL METHOD/SYSTEM

[75] Inventor: Thomas A. Genise, Dearborn, Mich.

[73] Assignee: Eaton Corporation, Cleveland, Ohio

[21] Appl. No.: 179,060

[22] Filed: Jan. 7, 1994

Related U.S. Application Data

[63] Continuation-in-part of Ser. No. 909,332, Jul. 6, 1992, Pat. No. 5,335,566.

[51] Int. Cl.$^6$ .................. B60K 41/18; F16H 59/48; F16H 59/70
[52] U.S. Cl. .................. 477/120; 477/70; 477/118; 477/904; 74/335
[58] Field of Search .................. 477/70, 78, 92, 120, 477/904, 118; 74/335

[56] References Cited

U.S. PATENT DOCUMENTS

| | | | |
|---|---|---|---|
| 4,361,060 | 11/1982 | Smyth | 477/78 |
| 4,467,427 | 8/1984 | Magnusson | 477/92 X |
| 4,595,986 | 7/1986 | Daubenspeck et al. | 364/424.1 |
| 4,648,290 | 3/1987 | Dunkley et al. | 477/78 |
| 4,765,201 | 8/1988 | Ishiguro et al. | 477/92 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,335,566 | 8/1994 | Genise et al. | 74/335 X |

FOREIGN PATENT DOCUMENTS 402017258   1/1990   Japan .................. 477/92

*Primary Examiner*—Dirk Wright
*Assistant Examiner*—Khoi Q. Ta
*Attorney, Agent, or Firm*—Howard D. Gordon

[57] ABSTRACT

A control system/method for an at least partially automated mechanical transmission system (10), including a controller (106) operated engine brake (EB), is provided. The control system/method is effective to determine if selected upshifts into a target gear ratio are feasible (212, 214) or not feasible (216) under current vehicle operating conditions and to prohibit the initiation of not feasible selected upshifts. The transmission system includes an engine brake actuator (23A) operable by the system controller (106). selected upshifts are evaluated and will be implemented, if feasible, in a sequence wherein feasibility is a function of engine deceleration (dES/dt), and engine deceleration is assigned expected values at minimum to progressively greater engine braking.

8 Claims, 6 Drawing Sheets

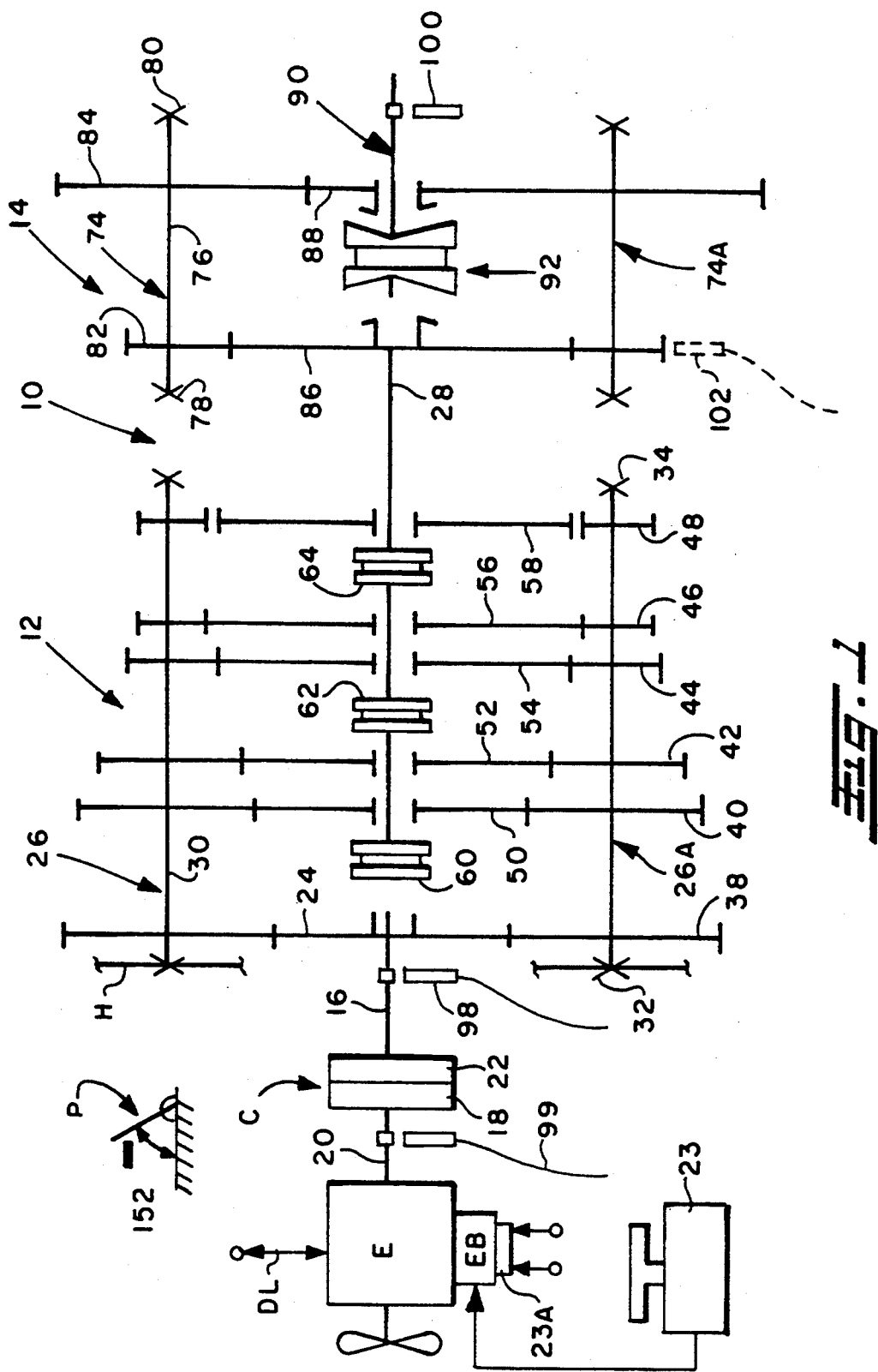

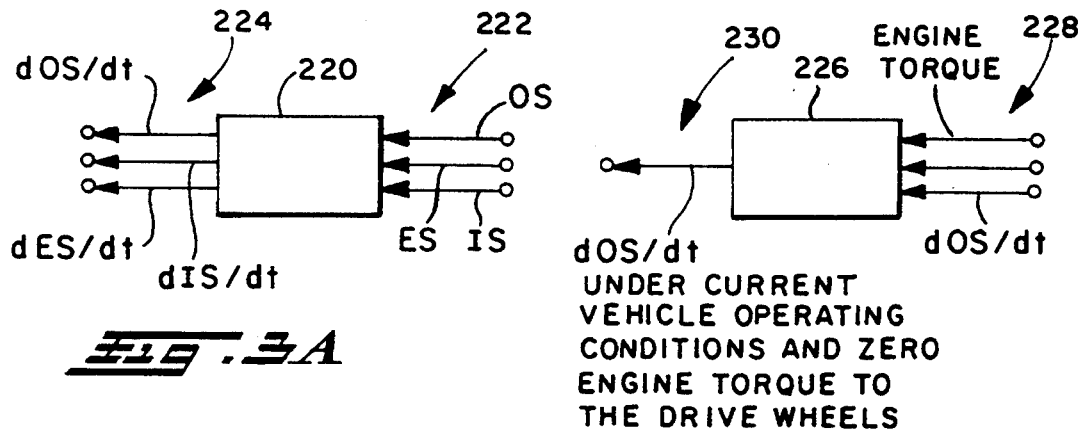
FIG. 3A
FIG. 3B
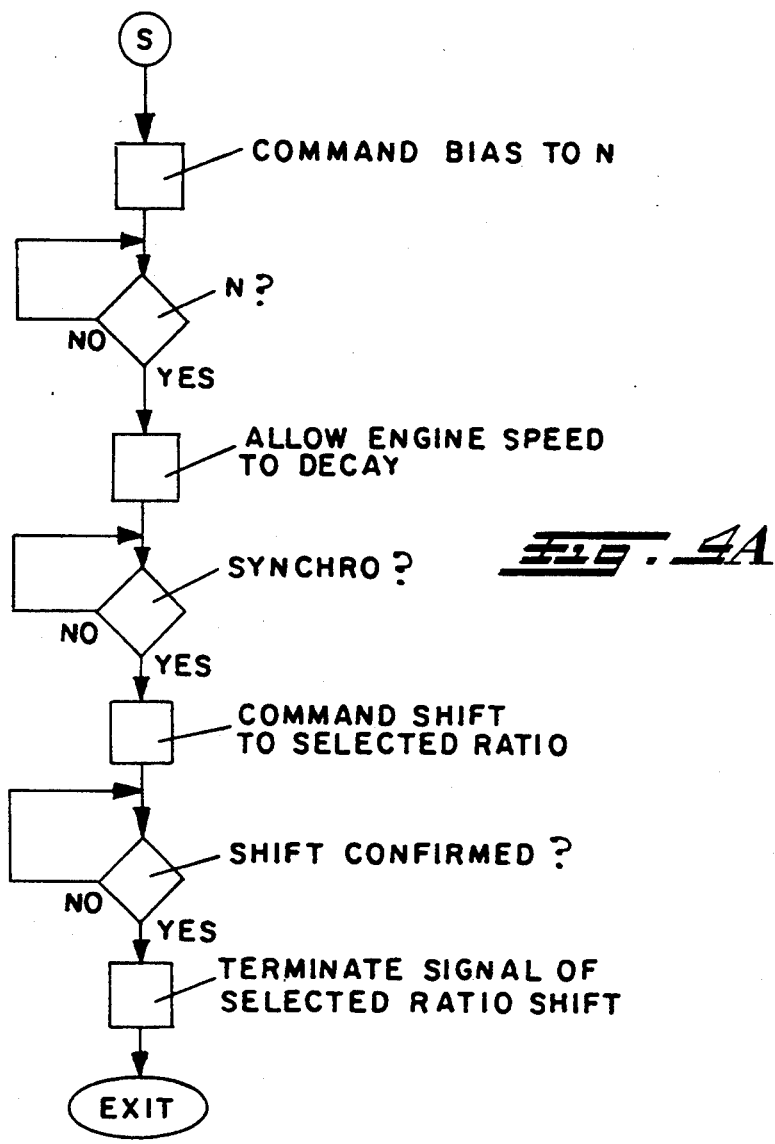
FIG. 4A

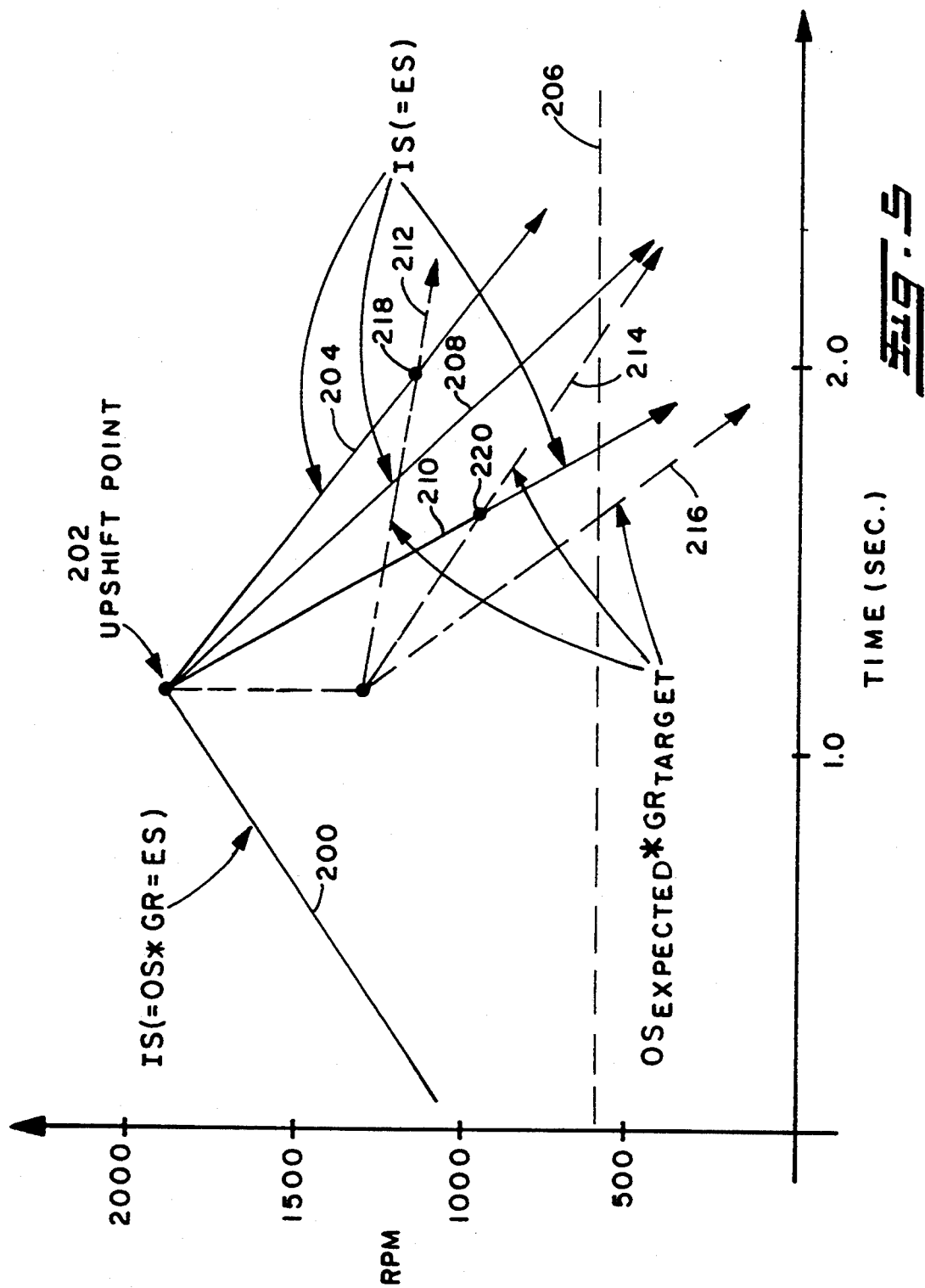

ENGINE BRAKE ENHANCED UPSHIFT CONTROL METHOD/SYSTEM

RELATED APPLICATIONS

This application is a continuation-in-part of application U.S. Ser. No. 07/909,332, filed Jul. 6, 1992, now U.S. Pat. No. 5,335,566, titled SHIFT CONTROL METHOD/SYSTEM, and assigned to the same assignee, EATON CORPORATION, as this application.

This application is related to application U.S. Ser. No. 08/103,947, filed Aug. 10, 1993, now allowed titled CONTROL SYSTEM/METHOD FOR ENGINE BRAKE-ASSISTED SHIFTING, and assigned to the same assignee, EATON CORPORATION, as this application.

BACKGROUND OF THE INVENTION

1. Field of Invention

This invention relates to control methods and systems for controlling the upshifting of at least partially automated vehicular mechanical transmission systems. In particular, the present invention relates to shift control methods/systems for automated mechanical transmission wherein the probabilities of successfully completing a selected upshift are evaluated in view of existing vehicle operating conditions and only feasible shifts are initiated. More particularly, the present invention relates to a control for evaluating the probabilities of successfully completing an upshift in a semi-automated mechanical transmission system, including an engine brake and not including a non-manual clutch actuator, under existing vehicle conditions, first under unassisted engine decay and then under engine decay rates enhanced by increasingly powerful engine brake retardation.

2. Description of the Prior Art

Fully automatic transmission systems, both for heavy-duty vehicles, such as heavy-duty trucks, and for automobiles, that sense throttle openings or positions, transmission shaft speeds, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Semi-automatic transmission systems utilizing electronic control units which sense engine fueling, throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic mechanical transmission systems may be seen by reference to U.S. Pat. Nos. 4,425,620; 4,631,679 and 4,648,290, the disclosures of which are incorporated herein by reference.

Another type of partially automated transmission system provides semi-automatic shift implementation for a mechanical transmission system for use in vehicles having a manually only controlled engine throttle means and/or a manually only controlled master clutch. This type of system usually has at least one mode of operation wherein the shifts to be semi-automatically implemented are automatically preselected and includes a control/display panel or console for operator selection of a ratio change or operation in the automatic preselection mode and indication of automatic preselection of upshifts, downshifts or shifts into neutral. An electronic control unit (ECU) is provided for receiving input signals indicative of transmission input and output shaft speeds and for processing same in accordance with predetermined logic rules to determine (i) if synchronous conditions exist, and (ii) in the automatic preselection mode, if an upshift or downshift from the currently engaged ratio is required and to issue command output signals to a transmission actuator for shifting the transmission in accordance with the command output signals. Transmission systems of this general type may be seen by reference to U.S. Pat. Nos. 5,050,079; 5,053,959; 5,053,961; 5,053,962; 5,063,511; 5,081,588; 5,089,962; and 5,089,965, the disclosures of which are hereby incorporated by reference.

While the above-described automatic and/or partial automatic shift implementation-type vehicular mechanical transmission systems are well suited for their intended applications, they are not totally satisfactory as they will occasionally initiate an attempted shift, which, due to vehicle operating conditions, cannot be completed. This especially was a concern for upshifts of these mechanical transmission systems not provided with an automated clutch actuator and/or an input shaft brake and thus have input shaft deceleration limited to the natural decay rate of the engine without the benefit of an input shaft brake or the like.

Engine brakes, usually called "engine compression brakes" or "exhaust brakes," are well known in the prior art and such devices (such as the well-known "Jake Brake") are commonly provided on heavy-duty vehicles. These devices are typically manually operated, may provide variable retardation by manual selection of one, two or three banks of cylinders operation, and are utilized to retard the vehicle and, in recent developments, to quickly retard engine/input shaft speed for more rapid synchronization during an upshift. Examples of vehicular automated mechanical transmission systems utilizing engine compression brakes may be seen by reference to U.S. Pat. Nos. 4,933,850; 5,255,650 and 5,042,327, the disclosures of which are incorporated herein by reference.

The present invention is applicable to the types of engine brakes discussed above and to other types of devices which may be used to selectively decelerate the rotational speed of an engine. The term "engine brake device" is intended to include all such devices.

Generally, engine compression brakes are effective to alter, usually hydraulically, the engine valve timing/porting so that a relatively large compressive force and resistance is provided to rotation of the engine. The prior art automated mechanical transmission systems of the type having manually operated engine brakes were not totally satisfactory, as engine brake-assisted upshifts tended to be somewhat harsh and abrupt.

SUMMARY OF THE INVENTION

In accordance with the present invention, the drawbacks of the prior art are minimized or overcome by the provision of a shift control method/system for a vehicular at least partially automated mechanical transmission system including an engine brake which, upon sensing automatic or manual selection of an upshift from a currently engaged gear ratio to a target gear ratio will, based upon currently sensed vehicle operating conditions, determine if the selected upshift is feasible (i.e., probably completible), first under normal engine decay rates and then under engine brake-enhanced decay rates, and only initiate feasible shifts.

A criticism of certain less than fully automated mechanical transmission systems (such as transmission systems without automatic master clutch control) is that under certain conditions they may not be able to complete some shifts they start (i.e., on a grade, low gear shifts, etc.). However, a transmission system does not have to be able to make all shifts under all conditions, it just needs to be "smart" enough to know not to start a shift it cannot finish. In accordance with the present invention, the transmission control, prior to initiation of a shift, will make a simple passive test for shiftability and requests for non-feasible upshifts are either modified or cancelled.

The above is accomplished by providing a shift control system which, upon selection of an upshift from a currently engaged ratio to a target ratio (usually as a function of engine fueling, throttle position, engine speed, vehicle speed and/or currently engaged ratio) will automatically predict the vehicle reaction to a torque break shift transient, determine an estimated vehicle speed at completion of the shift into the target ratio and compare this value to expected engine speed (equals input shaft speed) during the proposed shift transient to determine if the proposed shift is feasible, i.e., can substantial synchronous be achieved.

Feasibility is first determined under conditions of natural engine decay rates and, if under such conditions a proposed upshift is not feasible, the feasibility of the proposed upshift is then evaluated under conditions of engine brake-enhanced, preferably increasingly enhanced, engine speed decay (i.e., deceleration) rates.

If the proposed upshift is only feasible under enhanced engine decay rates, upshifts will be attempted and the engine brake will be utilized only when and to the extent required. Due to noise, wear and the like, the engine brake is used only as necessary and not for all upshifts.

If the proposed upshift is not feasible under even the highest setting of the engine brake, the shift request may be modified (i.e., a skip shift request changed to single shift) or cancelled for a predetermined period of time (such as 10 seconds).

In one embodiment, for vehicles of substantially constant gross combined weight ("GCW"), such as buses, mobile cranes, etc., assuming a vehicle equipped with an electronic data link, such as defined in SAE J 1922 or 1939 protocol, on which engine torque or a parameter indicative of engine torque may be sensed, upon determination that an upshift from a currently engaged ratio into a target ratio is desired, current engine torque and vehicle speed are sensed from which the controller can estimate vehicle deceleration at zero torque (i.e., during a shift transient). The system then proceeds to determine if the proposed upshift is feasible utilizing the logic discussed above.

Accordingly, a control system/method for a vehicular at least partially automated mechanical transmission system equipped with an engine brake device is provided which, under preselected conditions, will prohibit initiation of an upshift not deemed feasible.

This and other objects and advantages of the present invention will become apparent from a reading of the detailed description of the preferred embodiment taken in cognition with the attached drawings.

BRIEF DESCRIPTION OF THE DRAWINGS

FIG. 1 is a schematic illustration of a partially automated vehicular mechanical transmission system partially automated by the system of the present invention.

FIG. 3A is a schematic illustration of logic for differentiating signals representative of current vehicle and speed.

FIG. 3B is a schematic illustration of logic for calculating an expected vehicle acceleration during the shift transient when zero engine torque is applied to the drive wheels.

FIG. 4A is a schematic illustration, in flow chart format, of initiation and completion of a feasible shift.

FIG. 5 is a graphical representation of an upshift event illustrating both feasible and not feasible attempted shifts.

DESCRIPTION OF THE PREFERRED EMBODIMENT

Figure 3:
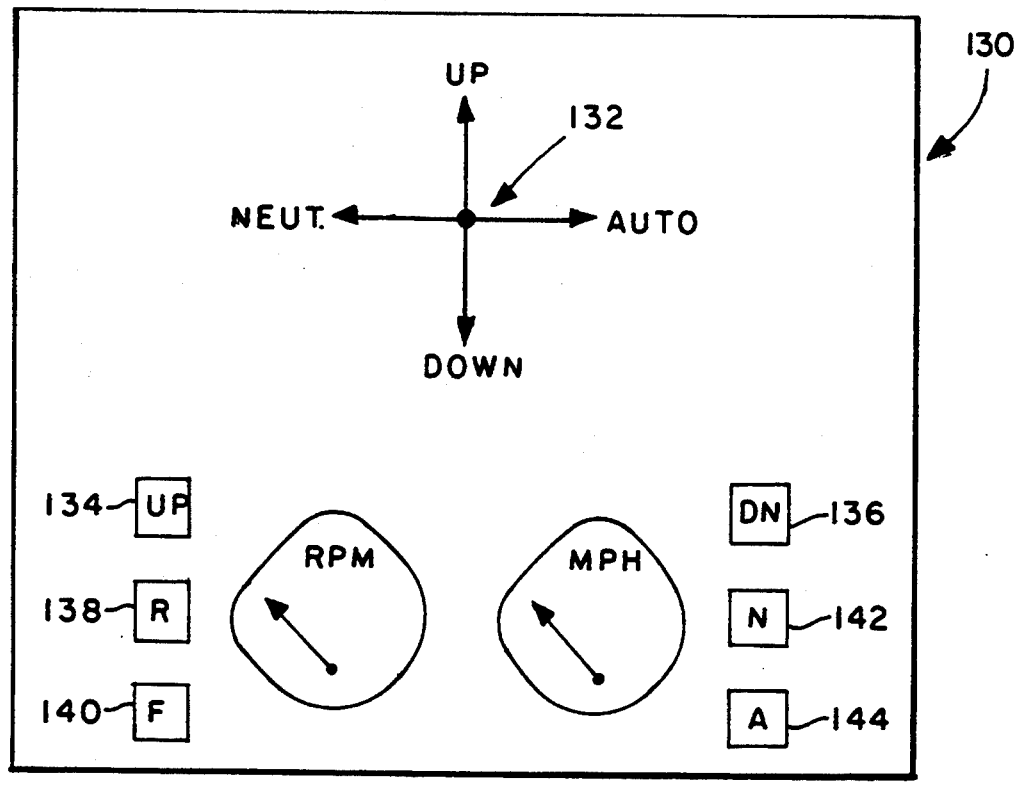
FIG. 3 is a schematic illustration of an alternate control console for the system of FIG. 2.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words specifically mentioned above, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio.

Referring to FIG. 1, a range type compound transmission 10 in a partially automated semi-automatic mechanical transmission system is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and may be connected to an electronic data link DL of the type defined in SAE J 1922 or J 1939 protocol, and the master clutch C is manually controlled by a clutch pedal (not shown) or the like. An engine brake (EB) operated by manual controller 23 may be provided, as is well known in the prior art. Engine brake EB is also operable by actuator 23A in response to command output signals from the system controller, as will be described in detail below.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

Partially automated vehicular mechanical transmission systems of the type illustrated may be seen by reference to above-mentioned U.S. Pat. Nos. 5,050,079; 5,053,959; 5,053,961; 5,053,962; 5,063,511 and 5,089,965. The present invention is also applicable to partially automated mechanical transmission systems of the type illustrated in U.S. Pat. Nos. 4,722,248 and 4,850,236, the disclosures of which are incorporated herein by reference.

Although the control method/system of the present invention is particularly useful for those automated mechanical transmission systems not having clutch actuators or input shaft brakes, the present invention is not limited to such use.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
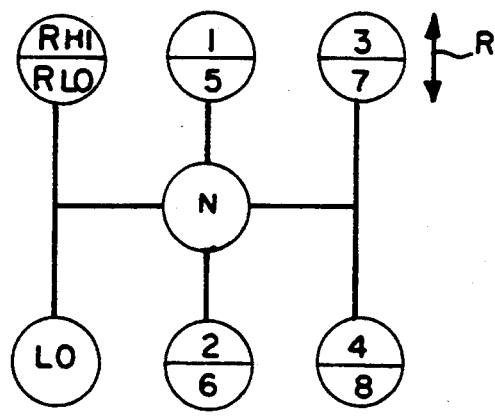
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single counter-shaft type.

For purposes of providing the automatic preselect mode of operation and the semi-automatic shift implementation operation of transmission 10, an input shaft speed (IS) sensor 98, an engine speed (ES) sensor 99, and an output shaft speed (OS) sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

Figure 2:
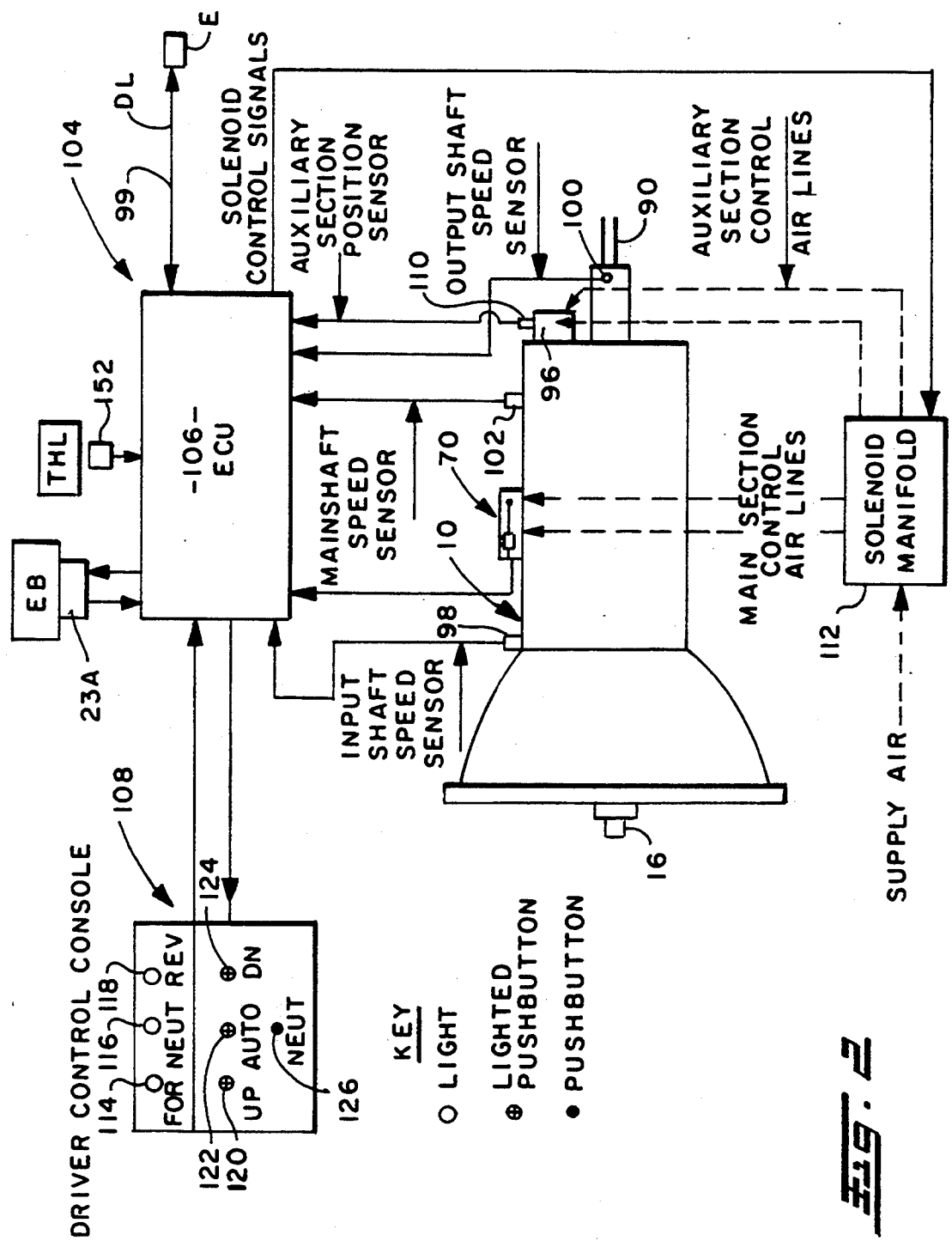
FIG. 2 is a schematic illustration of the automatic preselect and semi-automatic shift implementation system for a mechanical transmission system of the present invention.

The automatic preselect and semi-automatic shift implementation control system 104 for an automated mechanical transmission system of the present invention is schematically illustrated in FIG. 2. Control system 104, in addition to the mechanical transmission 10 described above, includes an electronic control unit 106, preferably microprocessor based, for receiving input signals, from the input shaft speed sensor 98, from the engine speed sensor 99, from the output shaft speed sensor 100 (or, alternatively, from the mainshaft speed sensor 102), from the shift actuators 70 and 96, from the driver control console 108, from a throttle pedal P position sensor 152 and/or from the engine E though data link DL. The ECU 106 may also receive inputs from an auxiliary section position sensor 110.

The ECU 106 may be of the type illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, to the driver control console 108, through the data link DL to engine E, and to the engine brake actuator 23A.

In the preferred embodiment, the driver control counsel allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection is made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine speed ES (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the operator or the ECU controller causing a torque reversal by manually momentarily decreasing and/or increasing the supply of fuel to the engine and/or manually or automatically disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged (GR target), which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

In the automatic preselection mode of operation, selected by use of lighted pushbutton 122, the ECU will, based upon stored logic rules, currently engaged ratio (which may be calculated by comparing input shaft to output shaft speed), output shaft or vehicle speed and/or throttle pedal position determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode and the shift preselected thereby by depression of pushbutton 122.

Under certain operating conditions of the vehicle, an automatically or manually selected shift may not be completible. These conditions usually involve upshifts when the vehicle is heavy loaded and/or is traveling against a great resistance, such as in mud, up a steep grade and/or into a strong headwind. To achieve substantial synchronous conditions to complete an upshift, the speed of the input shaft 10 (which substantially equals the speed of the engine E with the master clutch engaged) must be lowered to substantially equal the speed of the output shaft 90 (directly proportional to vehicle speed) multiplied by the target gear ratio. As an automated clutch actuator and input shaft brake are not provided, the speed of the input shaft will decrease with the rate of decay of engine speed. Thus, to achieve substantially synchronous conditions for engagement of the target ratio (GR target), IS should substantially equal OS * $GR_{TARGET}$ and, with the master clutch fully engaged, IS will substantially equal ES (ES=IS=OS * $GR_{TARGET}$).

Engine brakes EB, also known as an "engine compression brake," or an "exhaust brake" (such as the well-known "Jake Brake"), are well known in the heavy-duty truck industry. Briefly, such devices usually are manually actuated by an operator control, such as switch 23, and are effective to apply a retarding torque to rotation of an engine, usually by hydraulically modifying the configuration of the engine exhaust valving. The exhaust brakes typically are used to provide two functions: first, they are utilized to supplement the vehicle brake system to retard the vehicle under certain conditions, such as traveling downhill, and second, they also are utilized during an upshift of a transmission to more rapidly achieve synchronous condition by retarding the rotational speed of the input shaft more rapidly than would occur under the natural deceleration of the input shaft and/or engine in the absence of exhaust braking.

In the control system/method of the present invention, the controller 106 may cause actuator 23A to override the manual control 23 to selectively operate the engine brake, only when required and only to the extent required, to achieve completion of otherwise unavailable upshifts.

The sequence of an upshift of the illustrated automated mechanical transmission system is graphically illustrated in FIG. 5. Line 200 represents the input shaft speed (IS) at current vehicle conditions prior to the upshift point 202 wherein the current gear ratio (GR) is fully engaged, the master clutch C is fully engaged, and ES=IS=OS * GR. As the engine is defueled (i.e., fueling of the engine is reduced to a minimum value), the input shaft speed (IS) and engine speed (ES) will decrease at a known substantially constant (but not necessarily linear) rate (dIS/dt) until idle engine speed 206 is reached.

Line 204 represents the expected decay of the engine in the absence of engine braking, i.e., the natural decay rate. In a typical diesel engine of a heavy-duty truck, the unaided engine/input shaft decay rate is about 300 to 800 RPM per second and may be approximated as linear. The specific rate or rates of decay of the engine and/or input shaft may be predetermined or may be learned by differentiating the value of ES and/or IS signals during a defueling condition. See, for example, aforementioned U.S. Pat. No. 4,361,060. Lines 208 and 210, respectively, represent engine speed/input shaft speed decay as enhanced by low and high retardation applications, respectively, of the engine brake.

Lines 212, 214 and 216, respectively, represent the value of the product of expected output shaft speed multiplied by the target gear ratio ($OS_{EXPECTED}$ * $GR_{TARGET}$) under conditions of low, intermediate and high, respectively, resistance to vehicle forward motion. As is known, to achieve substantially synchronous conditions for engagement of the target gear ratio ($GR_{TARGET}$), the product of $OS_{TARGET}$ * $GR_{TARGET}$ should be substantially equal to IS (=ES with clutch C fully engaged).

As may be seen, under conditions of lower resistance to vehicle forward motion (line 212), substantially synchronous conditions (IS=$OS_{TARGET}$* $GR_{TARGET}$) will occur at point 218 at normal engine decay rates (line 204) and engine brake enhancement is not required. Under conditions of intermediate resistance (line 214), substantially synchronous conditions will occur at point 220 of high engine brake enhancement of engine decay (line 210) but will not be achieved at natural engine decay (204) or at intermediate engine brake enhancement (line 208). At high resistance to vehicle forward motion (line 216), the proposed upshift cannot be accomplished even with maximum application of the engine brake.

According to the upshift control method/system of the present invention, selected upshifts are evaluated, prior to initiation thereof, to determine if feasible or not feasible, and not feasible selections are either modified or cancelled. The upshift evaluation and initiation sequence according to the control system/method of the present invention is schematically illustrated, in flow chart format, in FIG. 4. Only if a shift is not feasible under unaided engine decay is feasibility evaluated under engine brake-enhanced engine deceleration rates. Only if required will the engine brake be used to achieve an upshift in view of the noise, wear and/or roughness associated with engine brake operation.

As may be seen by reference to FIG. 5, if the input shaft speed (IS) as determined by initial input shaft speed at point 202 and the deceleration of the input shaft (dIS/dt) will be equal to the product of expected output shaft speed at zero torque to the vehicle drive wheels ($OS_{TARGET}$), which is determined by initial OS (−IS/GR) and the vehicle acceleration (dOS/dt) at current resistance to vehicle motion, multiplied by the numerical value of the target gear ratio ($GR_{TARGET}$) at a value greater than a reference (such as engine idle speed 206), then achieving a synchronous shift into the selected target gear ratio is feasible; if not, achieving a substantially synchronous shift into the selected target gear ratio is infeasible. The OS and dOS/dt signals are, of course, equivalent of vehicle speed and vehicle acceleration signals, respectively.

In one embodiment of the present invention, for vehicles having a widely variable gross combined weight ("GCW"), i.e., combined weight of vehicle, fuel, cargo (if any) passengers (if any) and operator, the system logic will estimate GVW, usually by comparing vehicle acceleration at different drive wheel torque values. From this information, the system can determine what the vehicle acceleration (usually a deceleration) will be at zero driveline torque, i.e., the slope of lines 212, 214 or 216. Based upon this information and a present or learned value of engine decay rates, i.e., the slope of lines 204, 208 or 210, which may vary with engine speed, operating temperature, etc., the ECU can then determine if, under current vehicle operating conditions, the system is able to successfully complete the proposed shift. Based upon this information, the control system can then either (i) issue command signals to implement the proposed shift, or (ii) modify the proposed shift (usually command a single rather than a skip upshift, or (iii) cancel/prohibit the shift request for a predetermined period of time (such as, for example, about 10 seconds).

Briefly, the acceleration of the vehicle at zero torque can be approximated by the relationship $A_{O\ TORQUE} = A_i - (T_i/CW)$ where:
$A_i$ = vehicle acceleration at engine torque i,
C = a constant,
$T_i$ = engine torque (at drive wheel) i, and
W = gross vehicle weight.

The value of gross vehicle weight W and the constant C are determined during the momentary decrease in engine torque by determining the corresponding change on vehicle acceleration.

The above relationship is derived as follows:
$T = C_1W + C_2V^2 + C_3GW + C_4W/g$ (A) where:
T = engine torque (at drive wheel)
W = gross vehicle weight
V = vehicle velocity
G = a factor proportional to grade
A = current acceleration
Ci = constants, related to drivetrain and engaged gear ratio and where:
$C_1W$ represents engine torque, delivered to the drive wheels, to overcome rolling resistance;
$C_2V^2$ represents engine torque, delivered to the drive wheels, to overcome aerodynamic diag.
$C_3 \cdot G \cdot W$ represents engine torque, delivered to the drive wheels, to overcome grade resistance; and
$C_4(W/g) A$ represents engine torque, delivered to the drive wheels to achieve acceleration A A change in engine torque (at drive wheels), from $T_1$ to $T_2$, is represented:

$$T_1 - T_2 = C_1(W-W) + C_2(V_1^2 - V_2^2) + C_3 \cdot G(W-W) + C_4W/g(A_1 - A_2).$$

considering that:
W − W = O;
$V_1^2 - V_2^2 = O$ ($V_1$ almost equals $V_2$);
$C = C_4/g$,
the relationship may be rewritten:
$T_1 - T_2 = C \cdot W (A_1 - A_2)$, or
$(T_1 - T_2)/(A_1 - A_2) = C \cdot W$
Setting $T_2$ equal to zero torque,
$T_1 = C \cdot W (A_1 - A_0)$
$T_1 = C \cdot W \cdot A_1 - C \cdot W \cdot A_0$
$A_0 = (C \cdot W \cdot A_1 - T_1)/(C \cdot W)$ Torque at the drive wheels can be determined from torque at the engine flywheel and other drivetrain parameters. If gross vehicle weight is a known substantially constant value, such as in a bus, than the value for CW may be predetermined and memorized, which allows vehicle deceleration at zero torque under current operating conditions to be determined by sensing current engine torque ($T_1$) and vehicle acceleration ($A_1$) and solving for $A_0 = A_1 - (T_1/CW)$.

FIG. 3A schematically illustrates a logic element or subroutine 220 for differentiating various input signals 222, such as OS and/or ES, to determine the derivatives with respect to time thereof, dOS/dt and/or dES/dt, as output signals 224.

FIG. 3B schematically illustrates a logic element or subroutine 226 wherein input signals 228, including signals indicative of engine torque and vehicle acceleration (dOS/dt), are processed according to the logic rules set forth above to determine an output signal value 230 indicative of expected vehicle acceleration (dOS/dt) during the shift transient when no engine torque is applied to the vehicle drive wheels.

An alternate driver control and display console 130 may be seen by reference to FIG. 3. A joy stick 132 is movable against a resilient bias from its centered position to select upshifts, downshifts, a shift to neutral or the automatic preselect mode by movement up, down, leftward or rightward, respectively, as indicated. Indicia lights 134 and 136 are lighted to indicate an upshift or downshift, respectively, is preselected. Indicia lights 138 and 140, respectively, are lighted to indicate a vehicle forward or reverse, respectively, mode of operation indicia light 142 is steadily lighted to indicate a transmission neutral condition and is flashed to indicate a preselected but not yet confirmed neutral condition. Indicia light 144 is lighted to indicate system 104 is operating in the automatic preselection mode of operation.

The display/control console may also be of the "RNDHL" type (i.e., reverse-neutral-drive-hold-low)- with a manual upshift and downshift selector.

Figure 4:
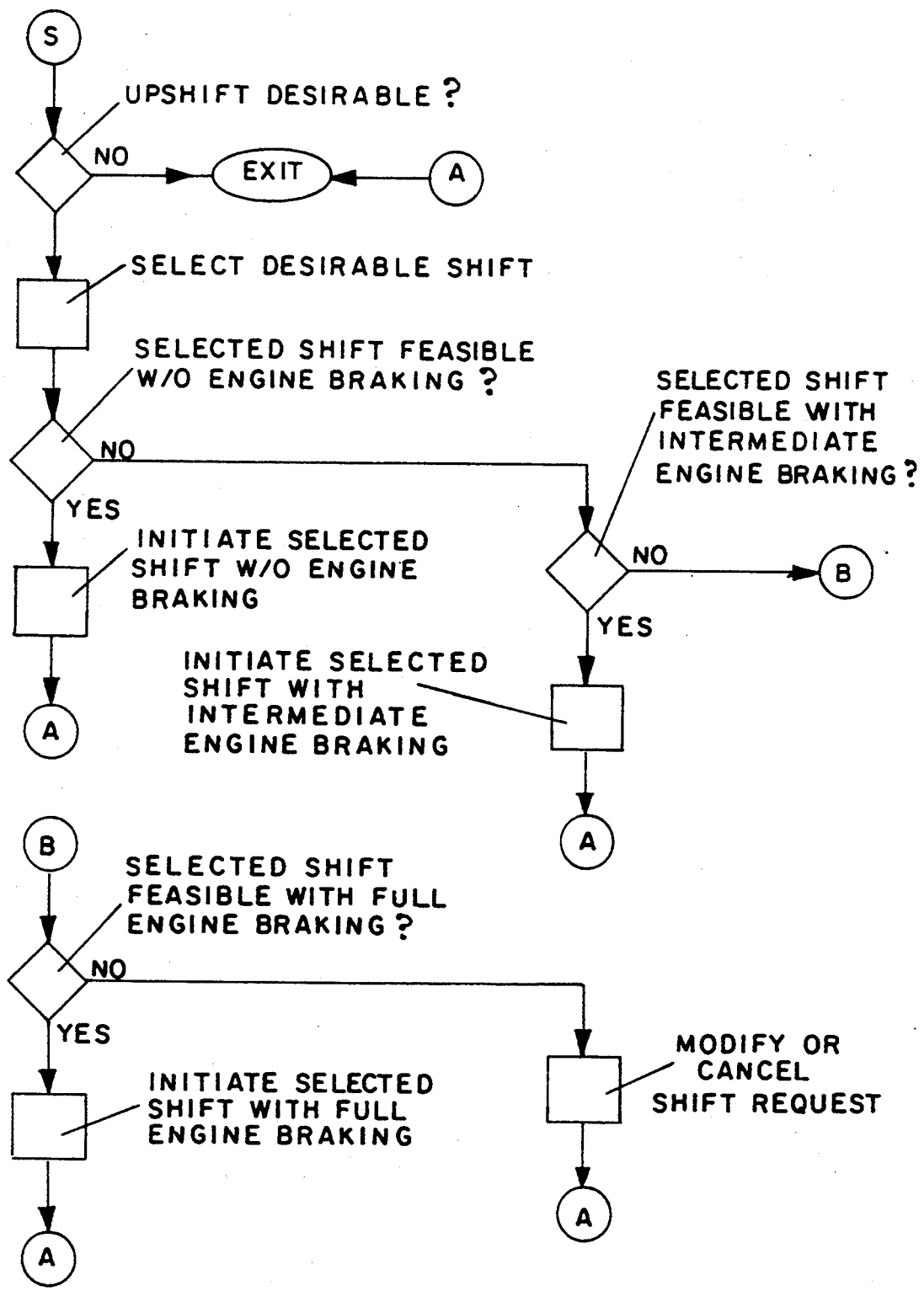
FIG. 4 is a schematic illustration, in flow chart format, of the inventive control method of the present invention.

Referring specifically to FIG. 4, it may be seen that the control system/method of the present invention evaluates and, if feasible, will implement upshifts in a sequence from minimum (i.e., zero) to progressively greater use of engine braking. By this control strategy, the engine brake is available to accomplish certain upshifts not available under natural engine decay, but engine braking is used only when necessary and then only to the degree necessary. The steps involved in initiating and completing a selected shift are illustrated in FIG. 4A.

Accordingly, it may be seen that a relatively simple and inexpensive shift implementation control system/- method for automated mechanical transmission systems 10 having an engine brake EB is provided. The control system/method automatically evaluates the feasibility, under current vehicle operating conditions, of manually or automatically preselected upshifts and either causes such proposed shifts to be executed, with the enhancement of engine braking if required, modified or cancelled.

Although the present invention has been described with a certain degree of particularity, it is understood that various changes to form and detail may be made without departing from the spirit and the scope of the invention as hereinafter claimed,

I claim:

1. A control method for controlling at least partially automated implementation of selected shifts of a vehicular mechanical change gear transmission system comprising a fuel throttle controlled engine (E), an engine brake device (EB), a multi-speed change gear mechanical transmission (10) having an input shaft (16) and an output shaft (90) adapted to drive vehicular drive wheels, said input shaft having a first determinable expected deceleration (204) during a gear ratio change operation under minimal fueling and in the absence of engine braking, and a second determinable expected deceleration (208, 210) under minimal fueling and under applied engine braking by said engine brake device, said second expected deceleration exceeding said first expected deceleration, a master friction clutch (C) drivingly interposed between the engine and the transmission, an actuator (23A) for non-manually operating said engine brake, a first sensor (98) for providing a first input signal indicative of transmission input shaft (16) rotational speed, a second sensor (100) for providing a second input signal indicative of vehicle speed, and a transmission actuator (112, 70, 96) for controlling shifting of the transmission, said control method characterized by:

- determining selection of an upshift from a currently engaged transmission ratio to a target gear ratio ($GR_{TARGET}$);
- determining an expected vehicle deceleration under current vehicle operating conditions and at zero engine torque to the drive wheels;
- determining as a function of (i) the expected vehicle deceleration under current vehicle operating conditions and at zero engine torque to the drive wheels, (ii) the gear ratio of the selected target gear ratio and (iii) said first expected deceleration, the feasibility or infeasibility of achieving substantially synchronous conditions for engagement of the target gear ratio if the selected shift is implemented and, if feasible, implementing the selected shift without actuation of said engine brake;
- if achieving substantially synchronous conditions is infeasible as a function of said first expected deceleration, then determining as a function of (i) the expected vehicle deceleration under current vehicle operating conditions and at zero engine torque to the drive wheels, (ii) the gear ratio of the selected target gear ratio and (iii) said second expected deceleration, the feasibility or infeasibility of achieving substantially synchronous conditions for engagement of the target gear ratio if the selected shift is implemented and, if feasible, implementing the selected shift with actuation of said engine brake device; and
- if achieving substantially synchronous conditions is infeasible as a function of said second expected deceleration, preventing implementation of said selected shift.

2. The control method of claim 1 wherein said transmission system includes a third sensor (DL) for providing an input signal indicative of engine torque and wherein determining the expected vehicle deceleration is done as a function of (i) current engine torque and (ii) current vehicle acceleration.

3. A control method for controlling at least partially automated implementation of selected shifts of a vehicular mechanical change gear transmission system comprising a fuel throttle controlled engine (E), an engine brake device (EB) having a first relatively lower engine retardation mode of operation and a second relatively higher engine retardation mode of operation, a multispeed change gear mechanical transmission (10) having an input shaft (16) and an output shaft (90) adapted to drive vehicular drive wheels, said input shaft having a first determinable expected deceleration (204) during a gear ratio change operation under minimal fueling and in the absence of engine braking, a second determinable expected deceleration (208) under minimal fueling and under applied engine braking by said engine brake device operating in said first mode of operation, said second expected deceleration exceeding said first expected deceleration, and a third determinable expected deceleration (210) under minimal fueling and under applied engine braking by said engine brake device operating in said second mode of operation, said third expected deceleration exceeding said second expected deceleration, a master friction clutch (C) drivingly interposed between the engine and the transmission, an actuator (23A) for nonmanually operating said engine brake in either the first or second modes of operation thereof, a first sensor (98) for providing a first input signal indicative of transmission input shaft (16) rotational speed, a second sensor (100) for providing a second input signal indicative of vehicle speed, a third sensor (DL) for providing an input signal indicative of engine torque and a transmission actuator (112, 70, 96) for controlling shifting of the transmission, said control method characterized by:

- determining selection of an upshift from a currently engaged transmission ratio to a target gear ratio;
- determining an expected vehicle deceleration under current vehicle operating conditions and at zero engine torque to the drive wheels;
- determining as a function of (i) the expected vehicle deceleration under current vehicle operating conditions and at zero engine torque to the drive wheels, (ii) the gear ratio of the selected target gear ratio and (iii) said first expected deceleration, the feasibility or infeasibility of achieving substantially synchronous conditions for engagement of the target gear ratio if the selected shift is implemented and, if feasible, implementing the selected shift without actuation of said engine brake device;
- if achieving substantially synchronous conditions is infeasible as a function of said first expected deceleration, then determining as a function of (i) the expected vehicle deceleration under current vehicle operating conditions and at zero engine torque to the drive wheels, (ii) the gear ratio of the selected target gear ratio and (iii) said second expected deceleration, the feasibility or infeasibility of achieving substantially synchronous conditions for engagement of the target gear ratio if the selected shift is implemented and, if feasible, implementing the selected shift with actuation of said engine brake device in said first mode of operation thereof;
- if achieving substantially synchronous conditions is infeasible as a function of said second expected deceleration, then determining as a function of (i) the expected vehicle deceleration under current vehicle operating conditions and at zero engine torque to the drive wheels, (ii) the gear ratio of the selected target gear ratio and (iii) said third expected deceleration, the feasibility or infeasibility of achieving substantially synchronous conditions for engagement of the target gear ratio if the selected shift is implemented and, if feasible, implementing the selected shift with actuation of said engine brake device in said second mode of operation thereof; and
- if achieving substantially synchronous conditions is infeasible as a function of said second expected deceleration, preventing implementation of said selected shift.

4. The control method of claim 3 wherein determining the expected vehicle acceleration is done as a function of (i) current engine torque and (ii) current vehicle acceleration.

5. A control system for controlling at least partially automated implementation of selected shifts of a vehicular mechanical change gear transmission system comprising a fuel throttle controlled engine (E), an engine brake (EB), a multi-speed change gear mechanical transmission (10) having an input shaft (16) and an output shaft (90) adapted to drive vehicular drive wheels, said input shaft having a first determinable expected deceleration (204) during a gear ratio change operation under minimal fueling and in the absence of engine braking, a second determinable expected deceleration (208, 210) under minimal fueling and under applied engine braking by said engine brake, said second expected deceleration exceeding said first expected deceleration, a master friction clutch (C) drivingly interposed between the engine and the transmission, an actuator (23A) for nonmanually operating said engine brake, a first sensor (98) for providing a first input signal indicative of transmission input shaft (16) rotational speed, a second sensor (100) for providing a second input signal indicative of vehicle speed, and a transmission actuator (112, 70, 96) for controlling shifting of the transmission, said control system characterized by:

means for determining selection of an upshift from a currently engaged transmission ratio to a target gear ratio;

means for determining an expected vehicle deceleration under current vehicle operating conditions and at zero engine torque to the drive wheels;

means for (a) determining as a function of (i) the expected vehicle deceleration under current vehicle operating conditions and at zero engine torque to the drive wheels, (ii) the gear ratio of the selected target gear ratio and (iii) said first expected deceleration, the feasibility or infeasibility of achieving substantially synchronous conditions for engagement of the target gear ratio if the selected shift is implemented and (b) if feasible, implementing the selected shift without actuation of said engine brake;

means for, if achieving substantially synchronous conditions is infeasible as a function of said first expected deceleration, then (a) determining as a function of (i) the expected vehicle deceleration under current vehicle operating conditions and at zero engine torque to the drive wheels, (ii) the gear ratio of the selected target gear ratio and (iii) said second expected deceleration, the feasibility or infeasibility of achieving substantially synchronous conditions for engagement of the target gear ratio if the selected shift is implemented and (b) if feasible, implementing the selected shift with actuation of said engine brake;

means for, if achieving substantially synchronous conditions is infeasible as a function of said second expected deceleration, preventing implementation of said selected shift.

6. The control system of claim 5 wherein said transmission system includes a third sensor (DL) for providing an input signal indicative of engine torque and determining the expected vehicle deceleration is done as a function of (i) current engine torque and (ii) current vehicle acceleration.

7. A control system for controlling at least partially automated implementation of selected shifts of a vehicular mechanical change gear transmission system comprising a fuel throttle controlled engine (E), an engine brake (EB) having a first relatively lower engine retardation mode of operation and a second relatively higher engine retardation mode of operation, a multi-speed change gear mechanical transmission (10) having an input shaft (16) and an output shaft (90) adapted to drive vehicular drive wheels, said input shaft having a first determinable expected deceleration (204) during a gear ratio change operation under minimal fueling and in the absence of engine braking, a second determinable expected deceleration (208) under minimal fueling and under applied engine braking by said engine brake operating in said first mode of operation, said second expected deceleration exceeding said first expected deceleration, and a third determinable expected deceleration (210) under minimal fueling and under applied engine braking by said engine brake operating in said second mode of operation, said third expected deceleration exceeding said second expected deceleration, a master friction clutch (C) drivingly interposed between the engine and the transmission, an actuator (23A) for nonmanually operating said engine brake in either the first or second modes of operation thereof, a first sensor (98) for providing a first input signal indicative of transmission input shaft (16) rotational speed, a second sensor (100) for providing a second input signal indicative of vehicle speed, a third sensor (DL) for providing an input signal indicative of engine torque and a transmission actuator (112, 70, 96) for controlling shifting of the transmission, said control system characterized by:

means for determining selection of an upshift from a currently engaged transmission ratio to a target gear ratio;

means for determining an expected vehicle deceleration under current vehicle operating conditions and at zero engine torque to the drive wheels;

means for (a) determining as a function of (i) the expected vehicle deceleration under current vehicle operating conditions and at zero engine torque to the drive wheels, (ii) the gear ratio of the selected target gear ratio and (iii) said first expected deceleration, the feasibility or infeasibility of achieving substantially synchronous conditions for engagement of the target gear ratio if the selected shift is implemented and (b) if feasible, implementing the selected shift without actuation of said engine brake;

means for, if achieving substantially synchronous conditions is infeasible as a function of said first expected deceleration, then (a) determining as a function of (i) the expected vehicle deceleration under current vehicle operating conditions and at zero engine torque to the drive wheels, (ii) the gear ratio of the selected target gear ratio and (iii) said second expected deceleration, the feasibility or infeasibility of achieving substantially synchronous conditions for engagement of the target gear ratio if the selected shift is implemented and (b) if feasible, implementing the selected shift with actuation of said engine brake in said first mode of operation thereof;

means for, if achieving substantially synchronous conditions is infeasible as a function of said second expected deceleration, then (a) determining as a function of (i) the expected vehicle deceleration under current vehicle operating conditions and at zero engine torque to the drive wheels, (ii) the gear ratio of the selected target gear ratio and (iii) said third expected deceleration, the feasibility or infeasibility of achieving substantially synchronous conditions for engagement of the target gear ratio if the selected shift is implemented and (b) if feasible, implementing the selected shift with actuation of said engine brake in said second mode of operation thereof; and means for, if achieving substantially synchronous conditions is infeasible as a function of said second expected deceleration, preventing implementation of said selected shift.

8. The control system of claim 7 wherein determining the expected vehicle acceleration is done as a function of (i) current engine torque and (ii) current vehicle acceleration.

* * * * *